US009202651B2

(12) United States Patent
Kinoshita et al.

(10) Patent No.: US 9,202,651 B2
(45) Date of Patent: Dec. 1, 2015

(54) UNIT FOR CONTROLLING ELECTROMAGNETIC RELAY, AND METHOD FOR CONTROLLING ELECTROMAGNETIC RELAY

(71) Applicant: OMRON Corporation, Koyoto-shi, Kyoto (JP)

(72) Inventors: Masahiro Kinoshita, Kyoto (JP); Hiroyuki Iwasaka, Kumamoto (JP); Wataru Nakamura, Kumamoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/418,357

(22) PCT Filed: Jul. 8, 2013

(86) PCT No.: PCT/JP2013/068612
§ 371 (c)(1),
(2) Date: Jan. 29, 2015

(87) PCT Pub. No.: WO2014/041883
PCT Pub. Date: Mar. 20, 2014

(65) Prior Publication Data

US 2015/0200068 A1 Jul. 16, 2015

(30) Foreign Application Priority Data

Sep. 11, 2012 (JP) ................................ 2012-199933

(51) Int. Cl.
*H01H 47/00* (2006.01)
*H01H 47/22* (2006.01)
(Continued)

(52) U.S. Cl.
CPC .................................... *H01H 47/22* (2013.01)

(58) Field of Classification Search
USPC ........................................................ 361/170
See application file for complete search history.

(56) References Cited

U.S. PATENT DOCUMENTS 5,381,954 A 1/1995 Tokizaki
6,661,635 B1 12/2003 Meid
(Continued)

FOREIGN PATENT DOCUMENTS

CN 1084292 A 3/1994
CN 101261908 A 9/2008
(Continued)

OTHER PUBLICATIONS

JP-2011-306943 ; Nov. 5, 1999; Entire Specification; Fig. 1-8, Hanshin Electric Comp.*
(Continued)

*Primary Examiner* — Dharti Patel
(74) *Attorney, Agent, or Firm* — Osha Liang LLP

(57) ABSTRACT

A unit for controlling one or more electromagnetic relays, each having a contact point and an exciting coil to which rated power is supplied so as to open and close the contact point, has a control circuit which carries out PWM control so as to keep an electromagnetic relay turned on, after turning on the electromagnetic relay by causing rated power to be supplied to an exciting coil of the electromagnetic relay, and a temperature detecting circuit that detects a resistance value of the exciting coil so as to allow the control circuit to calculate a temperature of the electromagnetic relay. The control circuit changes, depending on external information, a controlling value in accordance with which the PWM control is carried out with respect to the electromagnetic relay. The control circuit detects, from the temperature detecting circuit, a voltage corresponding to the resistance value of the exciting coil.

12 Claims, 20 Drawing Sheets

(51) Int. Cl.

| | |
|---|---|
| *H01H 9/00* | (2006.01) |
| *H01H 51/22* | (2006.01) |
| *H01H 51/30* | (2006.01) |
| *H02H 5/04* | (2006.01) |

(56) References Cited

U.S. PATENT DOCUMENTS

| | | | |
|---|---|---|---|
| 2008/0186645 | A1 | 8/2008 | Morimoto et al. |
| 2008/0218928 | A1 | 9/2008 | Baek |

FOREIGN PATENT DOCUMENTS

| | | | |
|---|---|---|---|
| JP | 11-306943 | A | 11/1999 |
| JP | 2003-505842 | A | 2/2003 |
| JP | 2004-178967 | A | 6/2004 |
| JP | 2005-261039 | A | 9/2005 |
| JP | 2007-018927 | A | 1/2007 |
| JP | 2008-192481 | A | 8/2008 |
| JP | 2008-293846 | A | 12/2008 |
| JP | 2010-272296 | A | 12/2010 |
| JP | 2011-210385 | A | 10/2011 |

OTHER PUBLICATIONS

JP-2008-192481; Yazaki Corport. Aug. 21, 2008, Speicification; Flg. 1-9.*

JP-2008-293846; Panasonic Electric works; Dec. 4, 2008; Fig. 1-9.*

JP-2007-18927; Omron Corp; Jan. 25, 2007; Specification; Fig. 1-6.*

International Search Report issued in PCT/JP2013/068612 mailed on Aug. 27, 2013 (4 pages).

Written Opinion of the International Searching Authority issued in PCT/JP2013/068612 mailed on Aug. 27, 2013 (5 pages).

Allowance of corresponding Japanese application No. 2012-199933 dated Oct. 8, 2013 (1 page).

Japanese Office Action for corresponding Japanese Application No. 2012-199933 mailed Aug. 20, 2013 (4 pages).

International Preliminary Report on Patentability issued in corresponding International Application No. PCT/JP2013/068612, mailed on Mar. 26, 2015 (10 pages).

Office Action issued in corresponding Korean Application No. 10-2015-7002166, mailed on May 15, 2015 (14 pages).

Office Action issued in corresponding Chinese Application No. 201380040104.9, mailed on Aug. 5, 2015 (10 pages).

* cited by examiner

FIG. 11

SERIES OF ACTION COMMANDS

| STEP | ACTIONS |
|---|---|
| 1 | OPERATE RELAY 6c |
| 2 | Wait 1sec |
| 3 | OPERATE RELAY 6a |
| 4 | Wait 5sec |
| 5 | OPERATE RELAY 6b |
| 6 | Wait 5sec |
| 7 | RETURN RELAY 6a |
| 8 | Wait 1sec |
| 9 | CARRY OUT PWM CONTROL WITH RESPECT TO RELAY 6b AND RELAY 6c |
| 10 | End |

$$RL = R1 \times \left(\frac{VCC}{VL} - 1\right)$$

FIG. 24

PWM VALUE= PWM REFERENCE VALUE
×VOLTAGE COEFFICIENT (VK)
×VIBRATION COEFFICIENT (SK)
×TEMPERATURE COEFFICIENT (TK)
×ADJACENCY COEFFICIENT (RK)

NOTE THAT MAXIMUM PWM VALUE IS 100%

UNIT FOR CONTROLLING ELECTROMAGNETIC RELAY, AND METHOD FOR CONTROLLING ELECTROMAGNETIC RELAY

BACKGROUND

1. Technical Field

The present invention relates to a unit and a method each for controlling an electromagnetic relay which opens and closes a contact point by applying an electric current to an exciting coil.

2. Related Art

Conventionally, there has been known a unit for controlling an electromagnetic relay which unit turns on an electromagnetic relay by supplying rated power to the electromagnetic relay and then, in order to maintain an on-state of the electromagnetic relay, controls a voltage, applied to an exciting coil, to be equal to or lower than an operating voltage and equal to or higher than a return voltage (Patent Literature 1).

The unit is a relay drive circuit which turns on an electromagnetic relay by applying, to an exciting coil, a voltage equal to or higher than an operating voltage by use of a collector current with which a semiconductor switching element has been turned on. The unit is configured so as to, after turning on the electromagnetic relay, control the voltage, applied to the exciting coil, to be equal to or lower than the operating voltage and equal to or higher than a return voltage, in order to keep the electromagnetic relay turned on.

The unit thus configured is capable of suppressing electric power consumption while keeping an electromagnetic relay turned on after turning the electromagnetic relay on.

CITATION LIST

Patent Literature 1

Japanese Patent Application Publication, Tokukaihei No. 11-306943 A (Publication Date: Nov. 5, 1999)

SUMMARY OF INVENTION

However, a control characteristic of an electromagnetic relay varies depending on a change in environment around the electromagnetic relay, such as a temperature and vibration. Therefore, the unit, having the aforementioned configuration, undesirably has difficulty in controlling the electromagnetic relay more suitably depending on the change in environment around the electromagnetic relay.

One or more embodiments of the present invention provides a unit and a method each for controlling an electromagnetic relay, each of which is capable of controlling an electromagnetic relay more suitably depending on a change in environment around the electromagnetic relay.

According to one or more embodiments of the present invention, a unit for controlling one or more electromagnetic relays each having a contact point and an exciting coil to which rated power is supplied so as to open and close the contact point, comprises: a control circuit which carries out PWM control so as to keep an electromagnetic relay turned on, after turning on the electromagnetic relay by causing rated power to be supplied to an exciting coil of the electromagnetic relay, the control circuit changing, depending on external information, a controlling value in accordance with which the PWM control is carried out with respect to the electromagnetic relay.

According to one or more embodiments of the present invention, a method for controlling one or more electromagnetic relays each having a contact point and an exciting coil to which rated power is supplied so as to open and close the contact point, comprises: a PWM control step of carrying out PWM control so as to keep an electromagnetic relay turned on, after turning on the electromagnetic relay by causing rated power to be supplied to an exciting coil of the electromagnetic relay, wherein a controlling value in accordance with which the PWM control is carried out with respect to the electromagnetic relay being changed depending on external information.

A unit for controlling an electromagnetic relay in accordance with one or more embodiments of the present invention changes, depending on external information, a controlling value in accordance with which PWM control is carried out with respect to an electromagnetic relay. A control characteristic of an electromagnetic relay is affected by a temperature, vibration, an on- or off-state(s) of other electromagnetic relay(s) adjacent to the electromagnetic relay, a voltage applied to an exciting coil, and/or the like. Therefore, by changing, depending on such external information, the controlling value in accordance with which PWM control is carried out with respect to the electromagnetic relay, it is possible to control the electromagnetic relay more suitably depending on a change in environment around the electromagnetic relay.

BRIEF DESCRIPTION OF DRAWINGS

FIG. 11 is a view illustrating a series of action commands in accordance with which the relay control unit operates the relays.

FIG. 23(*b*) is a perspective view illustrating external appearances of relays arranged so as to be adjacent to each other.

FIG. 24 is a view illustrating how the relay control unit calculates a PWM value.

DETAILED DESCRIPTION

The following description will discuss, in detail, embodiments of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiment 1

Configuration of Relay Control Unit 1

Figure 1:
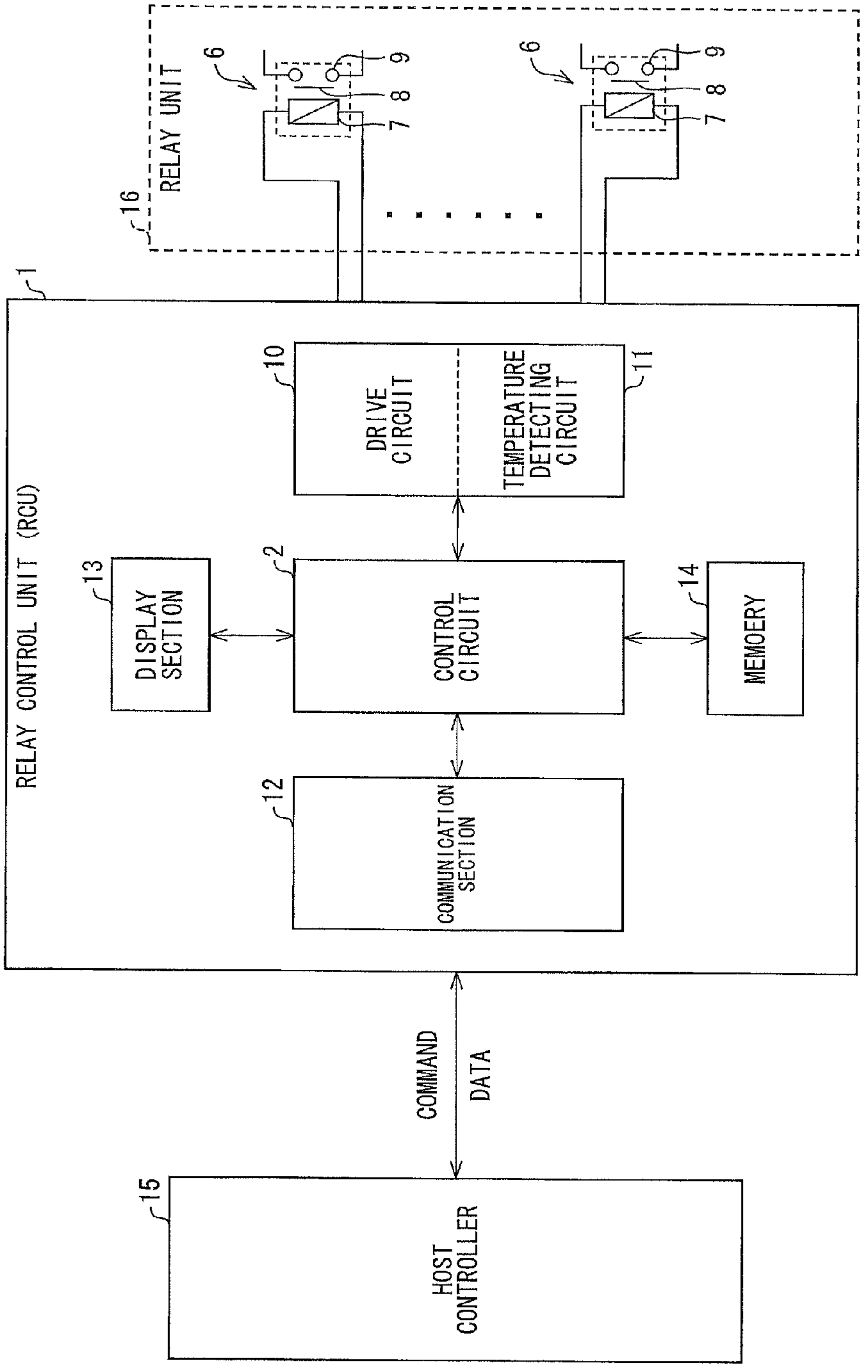
FIG. 1 is a block diagram illustrating a configuration of a relay control unit in accordance with Embodiment 1.

FIG. 1 is a block diagram illustrating a configuration of a relay control unit 1 (unit for controlling an electromagnetic relay) in accordance with Embodiment 1. The relay control unit 1 includes a communication section 12. The communication section 12 transmits/receives a command and data to/from a host controller 15. The relay control unit 1 further includes a control circuit 2. The control circuit 2 drives a plurality of relays 6 (electromagnetic relays), included in a relay unit 16, via respective drive circuits 10 in accordance with a command which the communication section 12 has received from the host controller 15. The control circuit 2 detects temperatures of the plurality of relays 6 via respective temperature detecting circuits 11.

Each of the plurality of relays 6 has a movable contact point 8, a fixed contact point 9, and an exciting coil 7 to which rated power is supplied from a corresponding one of the drive circuits 10 so as to turn on/off the movable contact point 8.

The relay control unit 1 includes a display section 13. The display section 13 displays how the control circuit 2 controls the plurality of relays 6. The relay control unit 1 further includes a memory 14. The memory 14 stores therein control data which the communication section 12 has received from the host controller 15 for control of each of the plurality of relays 6.

Figure 2:
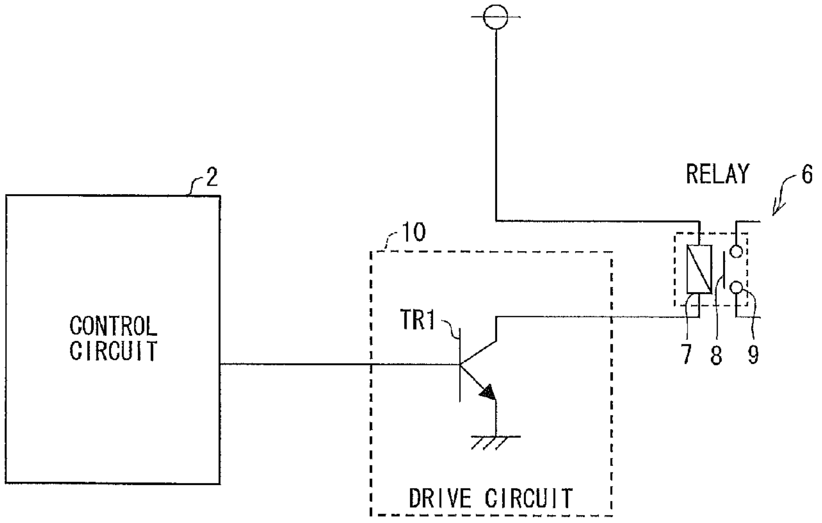
FIG. 2 is a block diagram illustrating a configuration of a drive circuit included in the relay control unit.

FIG. 2 is a block diagram illustrating a configuration of a drive circuit 10 included in the relay control unit 1. The drive circuit 10 has a transistor TR1. The transistor TR1 supplies a drive current (rated power) to an exciting coil 7 of a corresponding relay 6 in response to a drive signal supplied from the control circuit 2.

Figure 3:
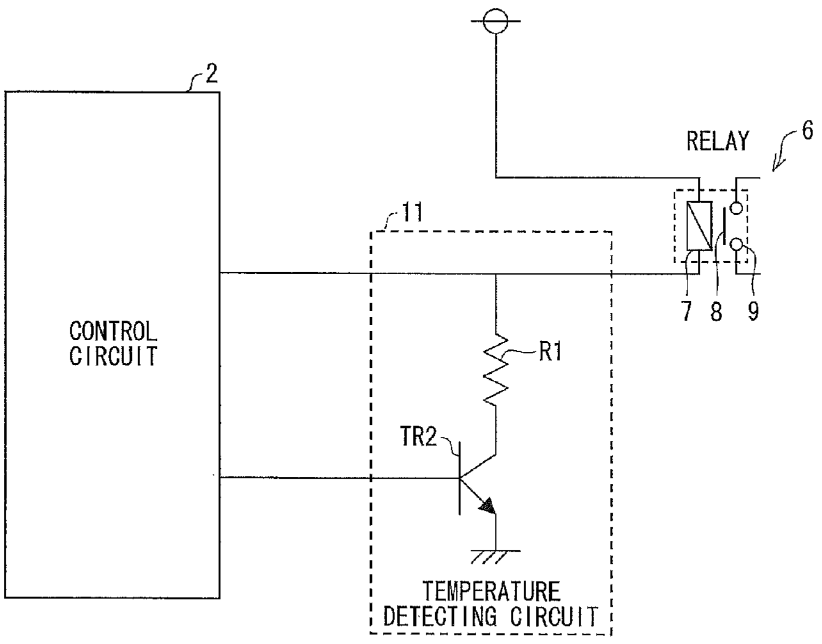
FIG. 3 is a block diagram illustrating a configuration of a temperature detecting circuit (weld detecting circuit) included in the relay control unit.

FIG. 3 is a block diagram illustrating a configuration of a temperature detecting circuit 11 included in the relay control unit 1. The temperature detecting circuit 11 has (i) a fixed resistor R1 connected to an exciting coil 7 of a corresponding relay 6 and (ii) a transistor TR2 connected to the fixed resistor R1. The control circuit 2 detects a temperature of the relay 6 in accordance with a change in resistance component of the exciting coil 7 which change is caused by a temperature of the exciting coil 7. While a corresponding drive circuit 10 is being turned off, the control circuit 2 turns on the transistor TR2, then measures a value of a voltage at an exciting coil 7 side of the fixed resistor R1, and converts the value into a temperature.

Note that the temperature detecting circuit 11 can be used to detect presence of a weld on a movable contact point 8 of the relay 6. That is, the control circuit 2 detects presence of a weld on the movable contact point 8 of the relay 6 in accordance with a change in inductance of the exciting coil 7 which change is caused by the presence of the weld on the movable contact point 8 the relay 6. When a step input signal is supplied to the transistor TR2 from the control circuit 2, the control circuit 2 detects the presence of the weld on the movable contact point 8 of the relay 6 in accordance with a transient response signal based on the exciting coil 7 and the fixed resistor R1.

The transistor TR1 illustrated in FIG. 2 and the transistor TR2 illustrated in FIG. 3 are each not limited to a transistor. Alternatively, each of the transistors TR1 and TR2 can be replaced with a switching element which is turned on or off in response to an input signal supplied from outside. Examples of the switching element encompass an FET, a photo-coupler, and a relay.

Operation of Relay Control Unit 1

Figure 4:
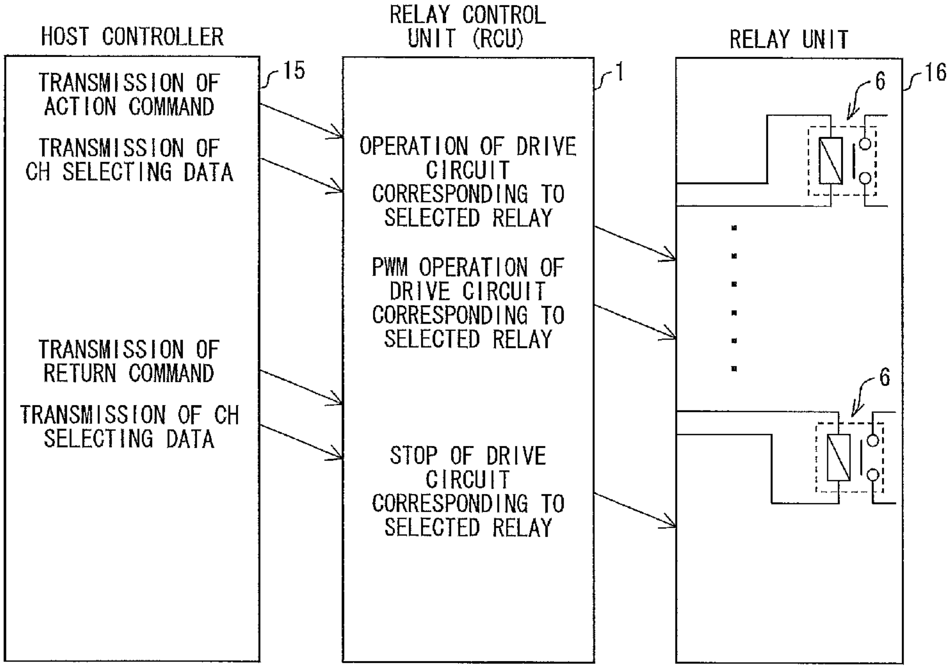
FIG. 4 is a block diagram illustrating how the relay control unit carries out PWM control.

FIG. 4 is a block diagram illustrating how the relay control unit 1 carries out PWM control. First, the host controller 15 transmits, to the relay control unit 1, (i) an action command which specifies each operation of the plurality of relays 6 and (ii) channel selecting data in accordance with which one of the plurality of relays 6, included in the relay unit 16, is selected. The relay control unit 1 then selects the one of the plurality of relays 6 in accordance with the channel selecting data received from the host controller 15.

Figure 5:
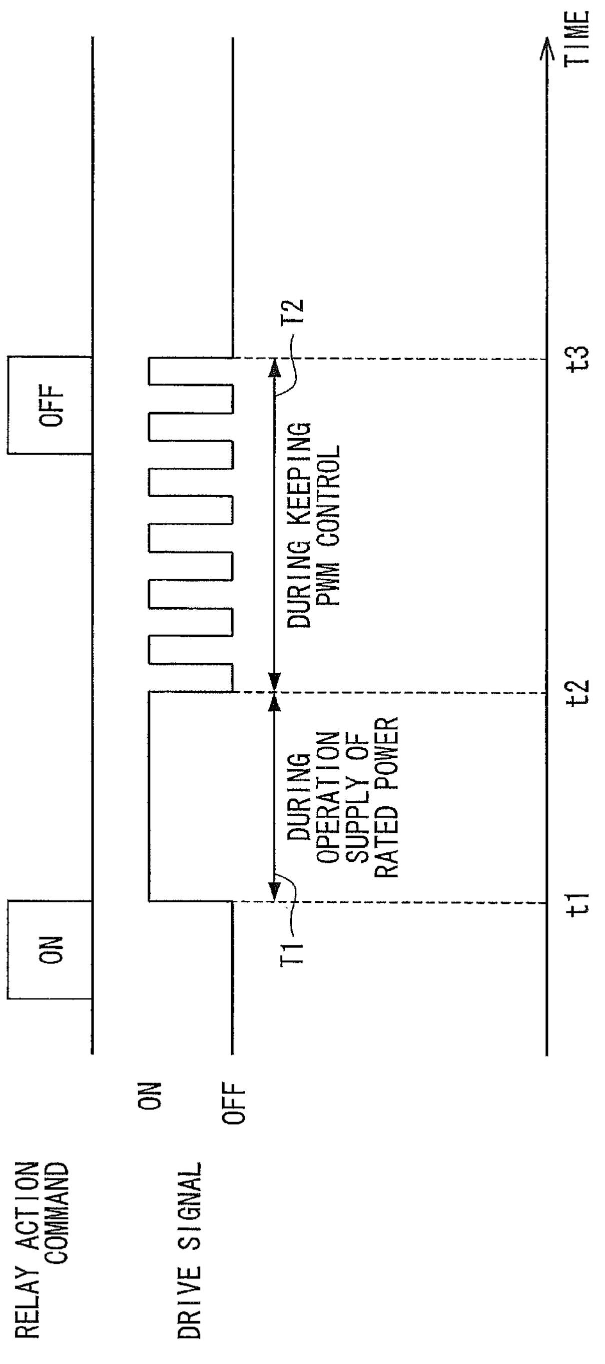
FIG. 5 is a waveform chart illustrating how the PWM control is carried out.

FIG. 5 is a waveform chart illustrating how the PWM control is carried out. The relay control unit 1 operates a corresponding drive circuit 10, connected to an exciting coil 7 of a selected relay 6, so as to, during a time period T1 between a time t1 and a time t2, supply rated power to the exciting coil 7 of the relay 6 and accordingly turn on a movable contact point 8 of the relay 6. Then, during a time period T2 between the time t2 and a time t3, the relay control unit 1 carries out the PWM control, while supplying electric power approximately half of the rated power to the exciting coil 7, so as to keep the movable contact point 8 turned on.

Next, the host controller 15 transmits, to the relay control unit 1, (i) a return command (action command for turning off each relay) which instructs each return of the plurality of relays 6 and (ii) a channel selecting data. The relay control unit 1 stops operation of a corresponding drive circuit 10, connected to a relay 6 selected in accordance with the channel selecting data, by turning off a drive signal at the time t3.

Figure 6:
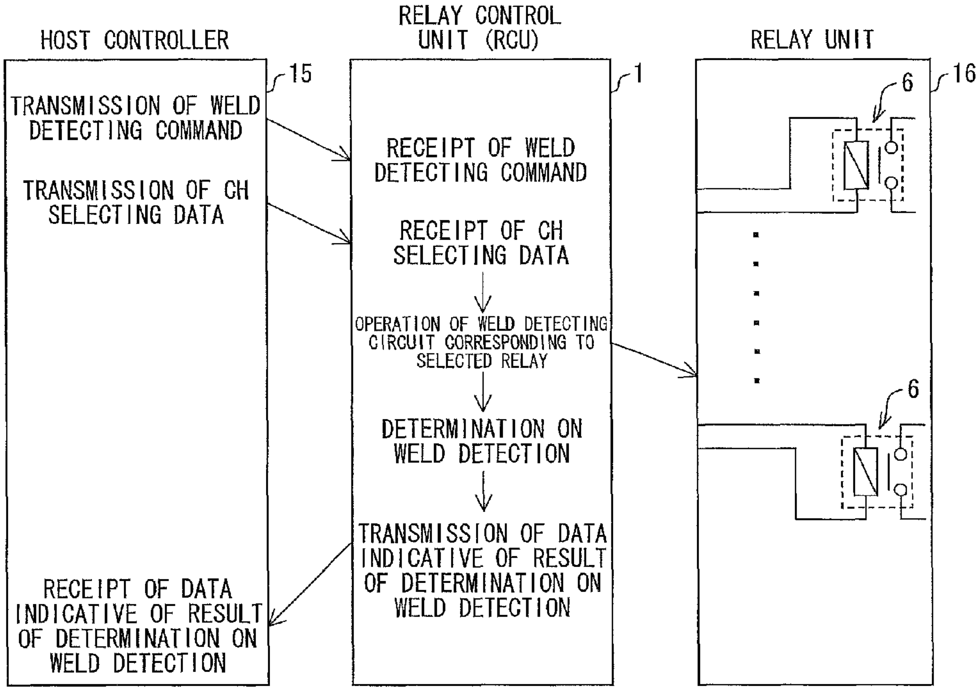
FIG. 6 is a block diagram illustrating how the relay control unit detects a weld.

FIG. 6 is a block diagram illustrating how the relay control unit 1 detects a weld. The host controller 15 transmits, to the relay control unit 1, (i) a weld detecting command which instructs detection of a weld on a movable contact point 8 of an exciting coil 7 and (ii) channel selecting data in accordance with which one of the plurality of relays 6 is selected. The relay control unit 1 receives the weld detecting command and the channel selecting data, and selects the one of the plurality of relays in accordance with the channel selecting data thus received.

Next, the relay control unit 1 operates a corresponding temperature detecting circuit (weld detecting circuit) 11 so as to determine whether or not a weld is present on a movable contact point 8 of a selected relay 6. Thereafter, the relay control unit 1 transmits, to the host controller 15, a result of the determination made by the temperature detecting circuit (weld detecting circuit) 11 on whether or not a weld is present on the movable contact point 8. The host controller 15 receives, from the relay control unit 1, the result of the determination made on whether or not a weld is present on the movable contact point 8.

Figure 7:
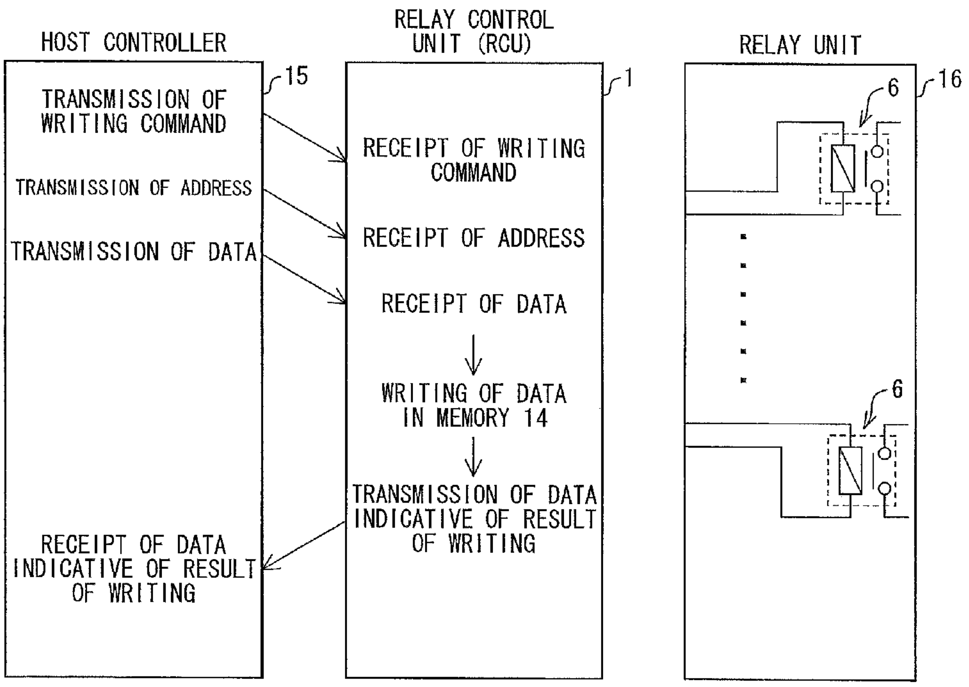
FIG. 7 is a block diagram illustrating how the relay control unit conducts memory writing operation.

FIG. 7 is a block diagram illustrating how the relay control unit 1 conducts memory writing operation. The relay control unit 1 writes, in the memory 14, each setting value of the plurality of relays 6.

The host controller 15 transmits, to the relay control unit 1, (i) control data in accordance with which the plurality of relays 6 are controlled and which is to be written in the memory 14, (ii) a writing command which instructs writing of the control data in the memory 14, and (iii) an address of the memory 14 in which the control data is to be written.

The relay control unit 1 receives the control data, the writing command, and the address each transmitted from the host controller 15. The relay control unit 1 then writes, in the memory 14, the control data received from the host controller 15, with reference to the address received from the host controller 15. The relay control unit 1 next transmits, to the host controller 15, data indicative of a result of the writing of the control data. The host controller 15 receives the data from the relay control unit 1.

Figure 8:
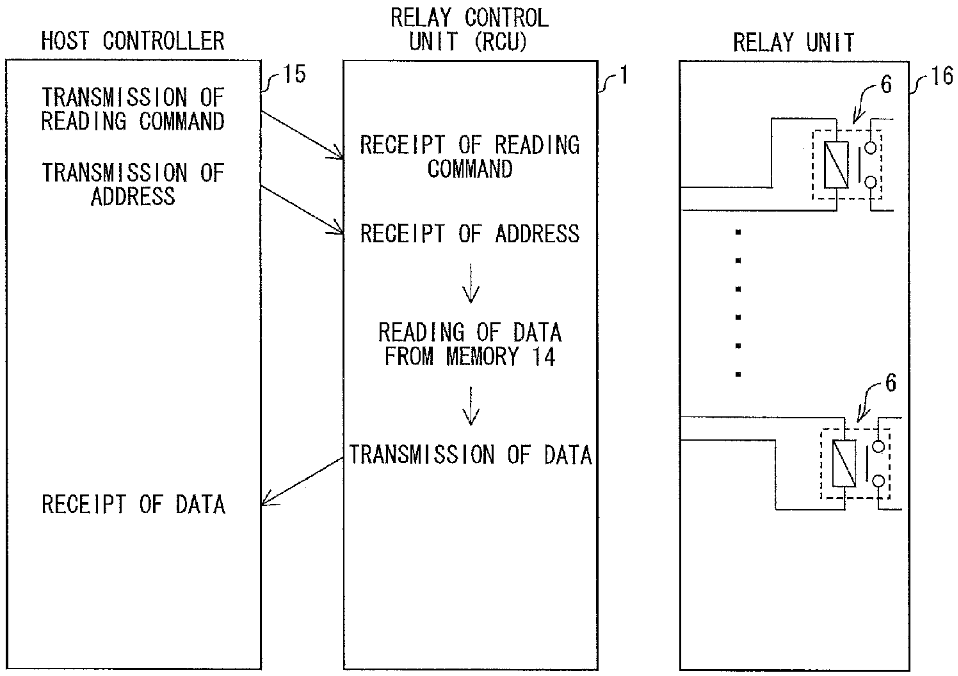
FIG. 8 is a block diagram illustrating how the relay control unit conducts setting value reading operation.

FIG. 8 is a block diagram illustrating how the relay control unit 1 conducts setting value reading operation. The relay control unit 1 reads out each setting value of the plurality of relays 6 which is stored in the memory 14.

The host controller 15 transmits, to the relay control unit 1, (i) a reading command which instructs reading of control data, in accordance with which the plurality of relays 6 are controlled, from the memory 14, and (ii) an address of the memory 14 from which the control data is to be read out. The relay control unit 1 receives the reading command and the address transmitted from the host controller 15. The relay control unit 1 next reads out the control data from the memory 14 with reference to the address transmitted from the host controller 15. Thereafter, the relay control unit 1 transmits, to the host controller 15, the control data thus read out from the memory 14. The host controller 15 receives the control data transmitted from the relay control unit 1.

Figure 9:
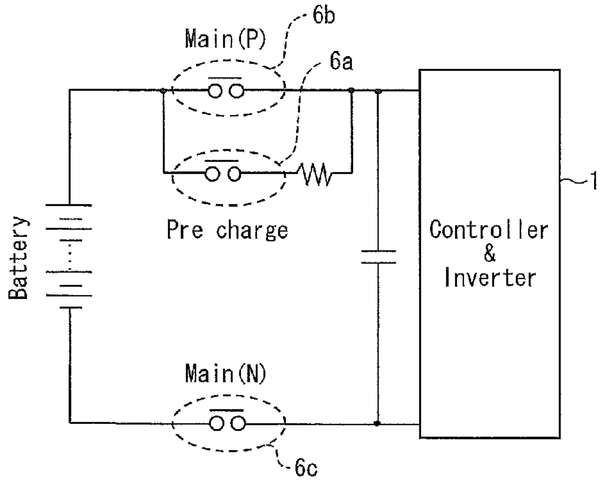
FIG. 9 is a circuit diagram illustrating in what order the relay control unit operates relays.
Figure 10:
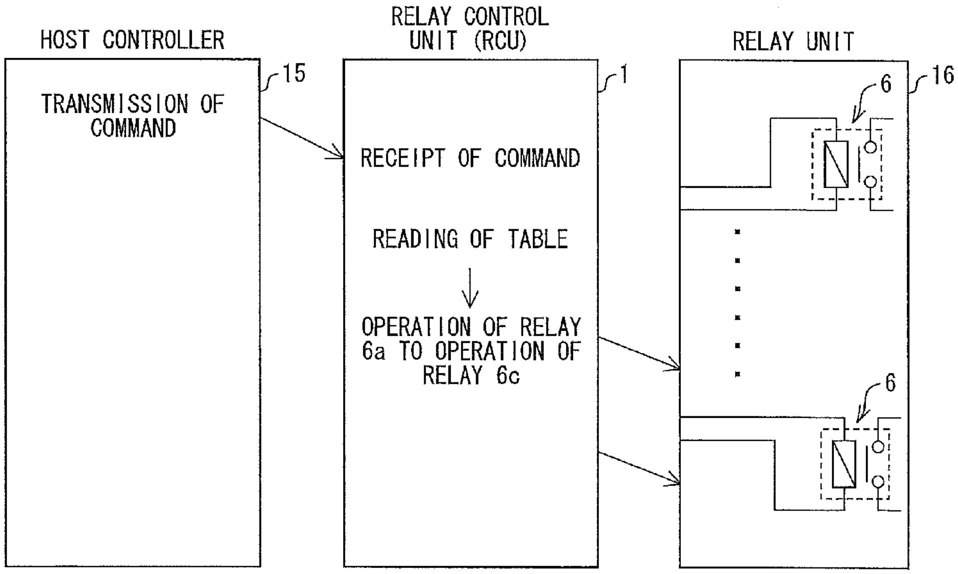
FIG. 10 is a block diagram illustrating in what order the relays are operated.

FIG. 9 is a circuit diagram illustrating in what order the relay control unit 1 operates the relays. FIG. 10 is a view illustrating in what order the relays are operated. FIG. 11 illustrates a series of action commands in accordance with which the relay control unit operates the relays.

According to FIG. 9, one end of a relay **6*b* is connected to a positive electrode terminal of a power source, and the other end of the relay 6*b* is connected to the relay control unit 1. Meanwhile, one end of the relay 6*a* is connected to the positive electrode terminal of the power source, and the other end of the relay 6*a* is connected to one end of a resistor. The other end of the resistor is connected to the relay control unit 1**.

One end of a relay **6*c* is connected to a negative electrode terminal of the power source, and the other end of the relay 6*c* is connected to the relay control unit 1. A capacitor is connected between the other end of the relay 6*b* and the other end of the relay 6*c***.

With this arrangement, the host controller 15 first transmits, to the relay control unit 1, a command which instructs the relay control unit 1 to operate the relays **6*a*, 6*b*, and 6*b* in a predetermined order. The relay control unit receives the command transmitted from the host controller 15. The relay control unit 1 then read out, from the memory 14, a table stored in advance in the memory 14, and operates the relays 6*a*, 6*b*, and 6*c*** in the following procedure.

First, the relay control unit 1 operates the relay **6*c*, and then stands by for 1 (one) second. Next, the relay control unit 1 operates the relay 6*a*, and then stands by for 5 seconds. Thereafter, the relay control unit 1 operates the relay 6*b***, and then stands by for 5 seconds.

Next, the relay control unit 1 returns the relay **6*a*, and then stands by for 1 (one) second. The relay control unit 1 carries out the PWM control with respect to the relays 6*b* and 6*c*. Thereafter, the relay control unit 1** ends the process.

Embodiment 2

Relay Control Unit 1*a*

Figure 12:
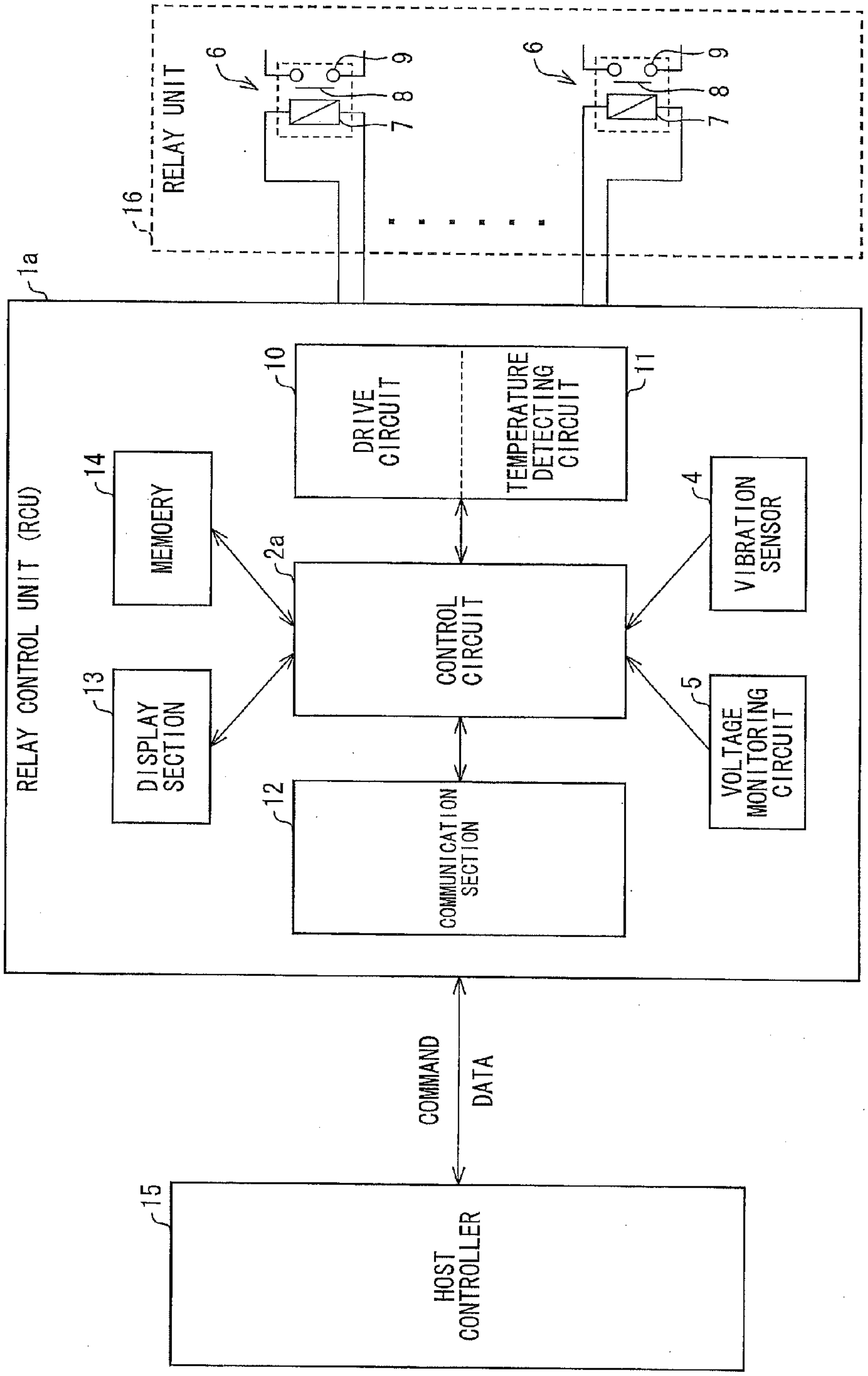
FIG. 12 is a block diagram illustrating a configuration of a relay control unit in accordance with Embodiment 2.

FIG. 12 is a block diagram illustrating a configuration of a relay control unit **1*a*** (electromagnetic relay) in accordance with Embodiment 2. Note that identical reference numerals are given to respective members identical to those in Embodiment 1, and the members will not be described below in detail.

The relay control unit **1*a* includes a communication section 12. The communication section 12 transmits/receives a command and data to/from a host controller 15. The relay control unit 1*a* further includes a control circuit 2*a*. The control circuit 2*a* drives a plurality of relays 6 (electromagnetic relays), included in a relay unit 16, via respective drive circuits 10 in accordance with a command which the communication section 12 has received from the host controller 15. The control circuit 2 detects a weld on the plurality of relays 6 via respective temperature detecting circuits (weld detecting circuits) 11**.

Each of the plurality of relays 6 has a movable contact point 8, a fixed contact point 9, and an exciting coil 7 to which rated power is supplied from a corresponding one of the drive circuits 10 so as to turn on/off the movable contact point 8.

The relay control unit **1*a* includes a display section 13. The display section 13 displays how the control circuit 2*a* controls the plurality of relays 6. The relay control unit 1*a* further includes a memory 14. The memory 14 stores therein control data which the communication section 12 has received from the host controller 15 for control of each of the plurality of relays 6**.

The relay control unit **1*a* further includes a vibration sensor 4 and voltage monitoring circuits 5, in addition to the temperature detecting circuits 11. Each of the temperature detecting circuits (weld detecting circuit) 11 converts, into a voltage, a resistance value which varies depending on a change in temperature of an exciting coil 7 of a corresponding one of the plurality of relays 6. The control circuit 2*a* converts the voltage into a temperature of the corresponding one of the plurality of relays 6. The control circuit 2*a* changes, depending on the temperature thus obtained, a controlling value in accordance with which the PWM control is carried out with respect to the corresponding one of the plurality of relays 6**.

The vibration sensor 4 detects vibration applied to each of the plurality of relays 6. The control circuit 2*a* changes, depending on a value of the vibration thus detected by the vibration sensor 4, a controlling value in accordance with which the PWM control is carried out with respect to the each of the plurality of relays 6.

Each of the voltage monitoring circuits 5 monitors a coil voltage applied to an exciting coil 7 of a corresponding one of the plurality of relays 6. The control circuit 2*a* changes, depending on the coil voltage monitored by the each of the voltage monitoring circuit 5, a controlling value in accordance with which the PWM control is carried out with respect to the corresponding one of the plurality of relays 6.

Operation of Relay Control Unit 1*a*

Calculation of Vibration Coefficient

Figure 13:
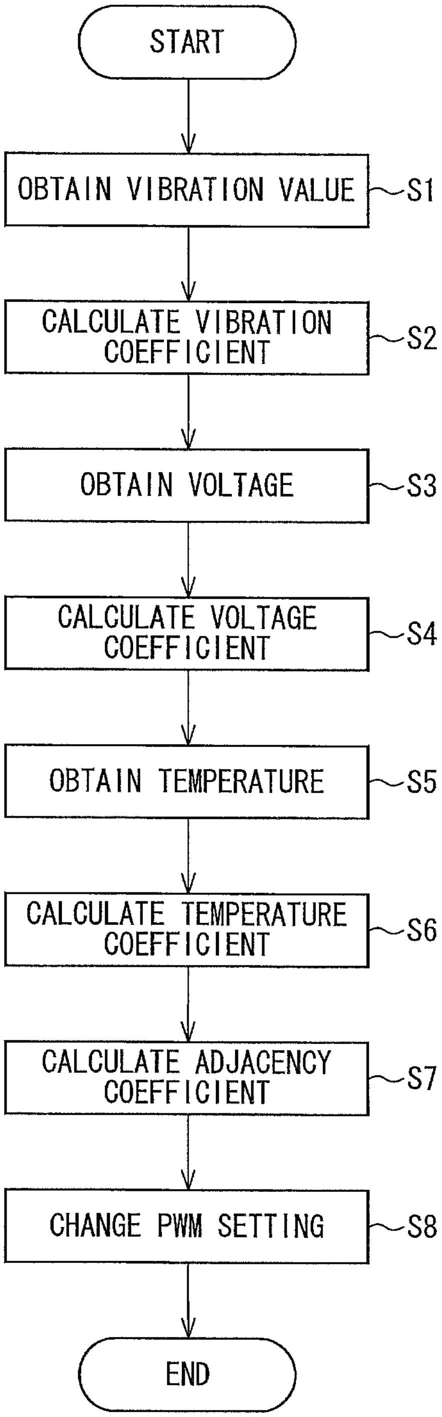
FIG. 13 is a flowchart illustrating how the relay control unit operates.

FIG. 13 is a flowchart illustrating how the relay control unit 1*a* operates. First, the vibration sensor 4 detects vibration applied to a relay 6 (step S1). The control circuit 2*a* changes, depending on the vibration thus detected by the vibration sensor 4, a controlling value in accordance with which the PWM control is carried out with respect to the relay 6 (step S2).

Figure 14:
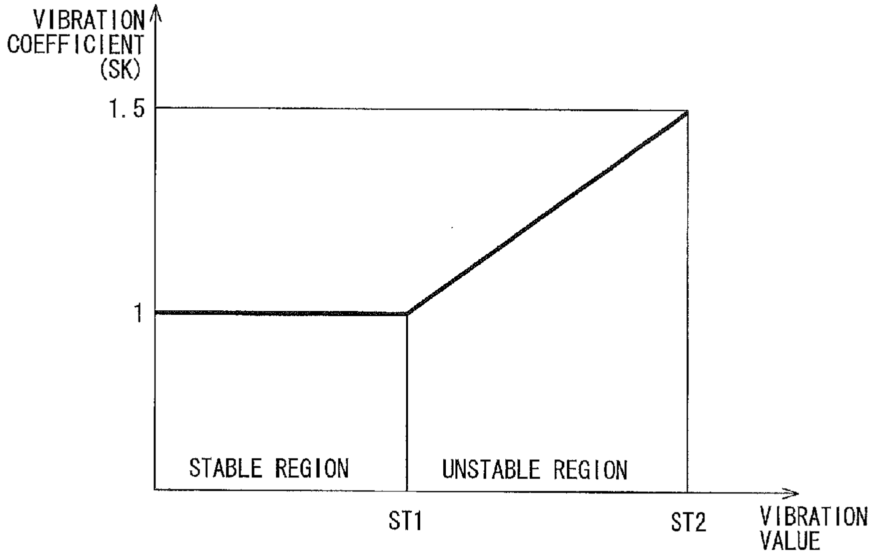
FIG. 14 is a graph illustrating how the relay control unit changes a PWM controlling value depending on a vibration value.

FIG. 14 is a graph illustrating how the relay control unit changes, depending on a value of vibration applied to a relay 6 (vibration value), a controlling value in accordance with which the PWM control is carried out (PWM controlling value). A region where a value of vibration, applied to the relay 6 and detected by the vibration sensor 4, is smaller than a vibration value ST1 is a stable region where the relay 6 stably operates. Meanwhile, a region where a value of vibration applied to the relay 6 is not less than the vibration value ST1 and not more than a vibration value ST2, which is a rated vibration value, is an unstable region where the relay 6 does not stably operate.

In a case where a vibration value falls within the stable region, the control circuit 2*a* sets, to 1 (one), a vibration coefficient SK based on which the PWM controlling value is determined. In a case where a vibration value falls within the unstable region, the control circuit 2*a* linearly increases, depending on an increase in vibration value, the vibration coefficient SK, based on which the PWM controlling value is determined (see FIG. 14). For example, in a case where a vibration value increases to the vibration value ST2, the control circuit 2*a* increases the vibration coefficient SK to 1.5. The control circuit 2*a* thus changes the controlling value in accordance with which the PWM control is carried out with respect to the relay 6, depending on vibration which is applied to the relay 6 and which is detected by the vibration sensor 4.

Calculation of Voltage Coefficient

Again with reference to FIG. 13, a corresponding voltage monitoring circuit 5 monitors a coil voltage applied to an exciting coil 7 of a relay 6. The control circuit 2*a* obtains data of the coil voltage monitored by the voltage monitoring circuit 5 (step S3). The control circuit 2*a* then calculates and changes, depending on the coil voltage, a voltage coefficient based on which the PWM controlling value, in accordance with which the PWM control is carried out with respect to the relay 6, is determined (step S4).

Figure 15:
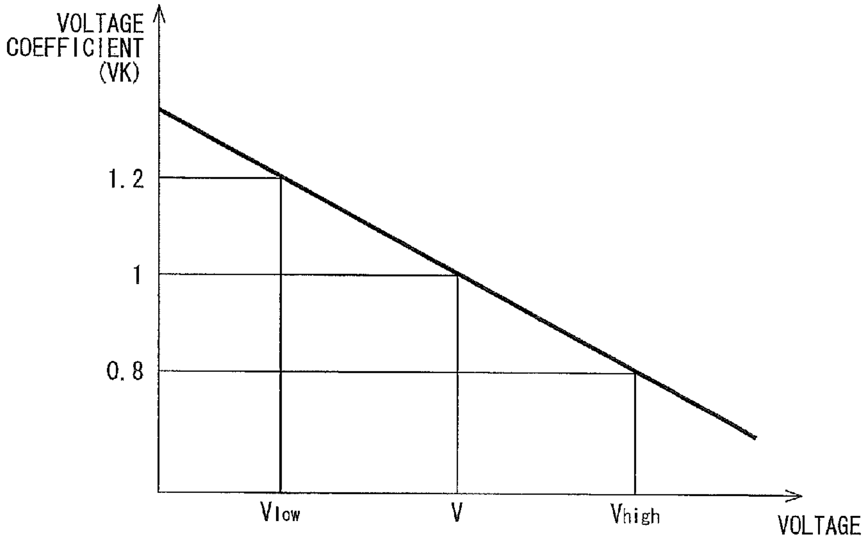
FIG. 15 is a graph illustrating how the relay control unit changes a PWM controlling value depending on a voltage.

FIG. 15 is a graph illustrating how the relay control unit 1*a* changes a PWM controlling value depending on a coil voltage. A horizontal axis indicates a voltage applied to an exciting coil 7 of a relay 6. A vertical axis indicates a voltage coefficient VK based on which the PWM controlling value, in accordance with which the PWM control is carried out with respect to the relay 6, is determined.

In a case where a voltage V of 12 V (rated voltage) is applied to the exciting coil 7, the control circuit 2*a* sets the voltage coefficient VK, based on which the PWM controlling value is determined, to 1 (one). In a case where a voltage Vhigh of 14.4 V (standard upper limit voltage) is applied to the exciting coil 7, the control circuit 2*a* sets the voltage coefficient VK, based on which the PWM controlling value is determined, to 0.8. In a case where a voltage Vlow of 9.6V (standard lower limit voltage) is applied to the exciting coil 7, the control circuit 2*a* sets the voltage coefficient VK, based on which the PWM controlling value is determined, to 1.2. The control circuit 2*a* thus changes the controlling value in accordance with which the PWM control is carried out, depending on a voltage applied to the exciting coil 7. In a case where a voltage decreases, the control circuit 2*a* increases the voltage coefficient so that a time period during which PWM is turned on becomes longer.

Calculation of Temperature Coefficient

Again with reference to FIG. 13, a corresponding temperature detecting circuit 11 detects a resistance value of an exciting coil 7 of a relay 6, and the control circuit 2*a* obtains data of a temperature of the relay 6 (step S5). The control circuit 2*a* then changes, depending on the temperature of the relay 6 thus obtained, a temperature coefficient TK based on which the PWM controlling value, in accordance with which the PWM control is carried out with respect to the relay 6, is determined (step S6).

Figure 16:
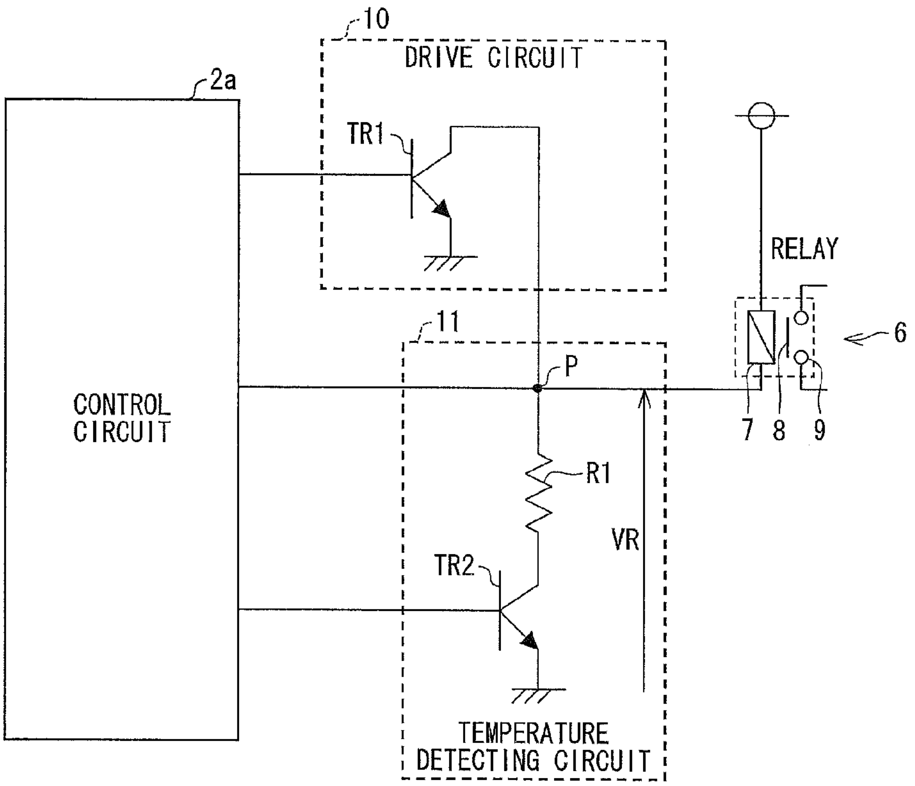
FIG. 16 is a circuit diagram illustrating configurations of a temperature detecting circuit (weld detecting circuit) and a drive circuit each of which is provided in the relay control unit.

FIG. 16 is a circuit diagram illustrating configurations of a temperature detecting circuit (weld detecting circuit) 11 and a drive circuit 10 each of which is provided in the relay control unit 1*a*. The drive circuit 10 has a transistor TR1. The transistor TR1 supplies a drive current (rated power) to an exciting coil 7 of a corresponding relay 6 in response to a drive signal supplied from the control circuit 2*a*. The temperature detecting circuit (weld detecting circuit) 11 has (i) a fixed resistor R1 connected to the exciting coil 7 and (ii) a transistor TR2 connected to the fixed resistor R1. The control circuit 2*a* detects presence of a weld on a movable contact point 8 of the relay 6 in accordance with a change in inductance of the exciting coil 7 which change is caused by the presence of the weld on the movable contact point 8 of the relay 6. When a step input signal is supplied to the transistor TR2 from the control circuit 2*a* while the drive circuit 10 is being turned off, the control circuit 2*a* detects the presence of the weld on the movable contact point 8 of the relay 6 in accordance with a transient response signal based on the exciting coil 7 and the fixed resistor R1.

Figure 17:
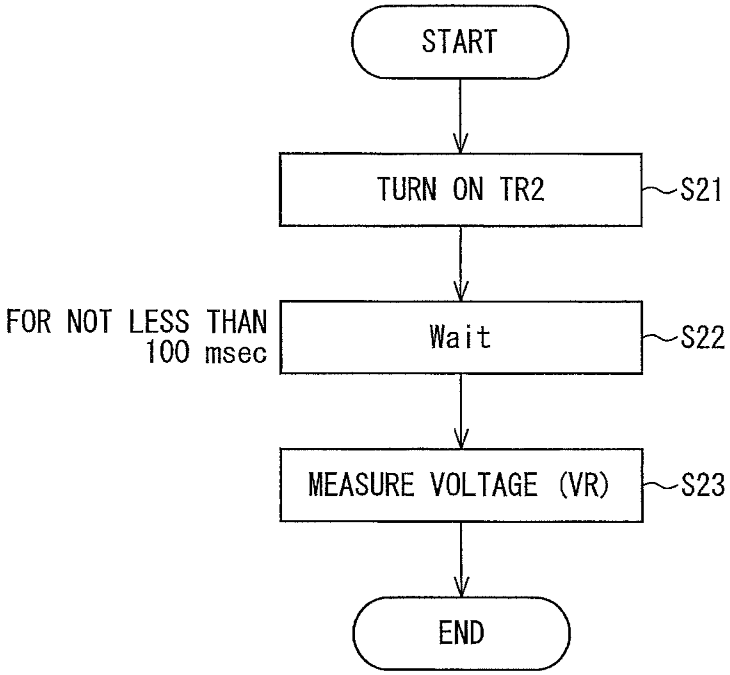
FIG. 17 is a flowchart illustrating how the temperature detecting circuit (weld detecting circuit) detects a resistance value of an exciting coil and calculates a temperature of the exciting coil.

FIG. 17 is a flowchart illustrating how the temperature detecting circuit (weld detecting circuit) 11 detects a resistance value of the exciting coil 7 and the control circuit 2*a* calculates a temperature of the exciting coil 7. FIG. 17 illustrates an example case where, before causing the drive circuit 10 to drive the relay 6, the control circuit 2*a* measures the temperature of the exciting coil 7.

First, the control circuit 2*a* turns on the transistor TR2 (step S21). The control circuit 2*a* then stands by for not less than 100 msec (step S22). Next, the control circuit 2*a* measures a voltage VR at a point P positioned between the fixed resistor R1 and the exciting coil 7 (step S23).

Figure 18:
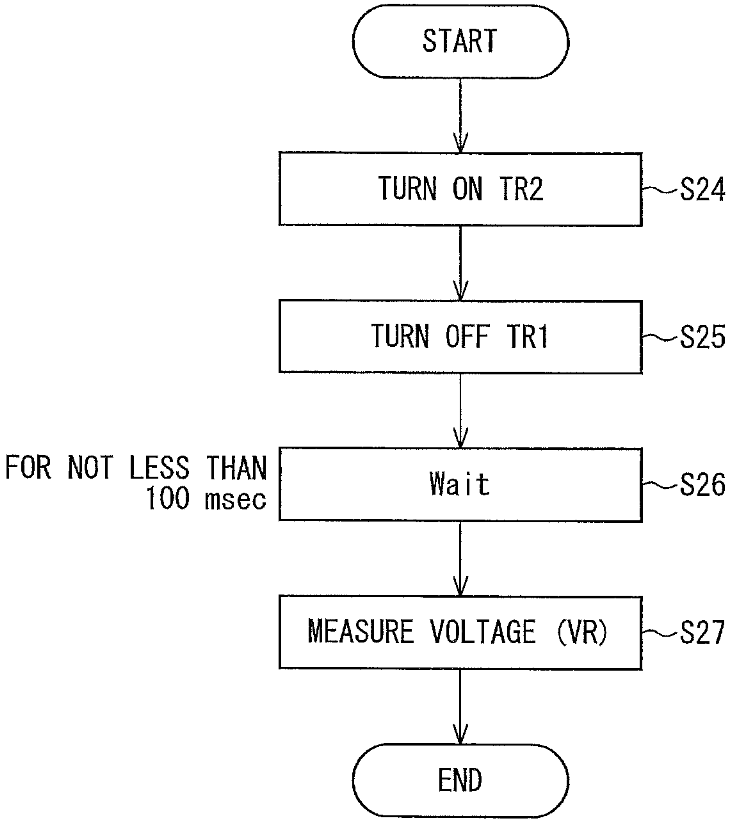
FIG. 18 is a flowchart illustrating how the temperature detecting circuit (weld detecting circuit) alternatively detects a resistance value of the exciting coil and calculates a temperature of the exciting coil.

FIG. 18 is a flowchart illustrating how, alternatively, the temperature detecting circuit (weld detecting circuit) 11 detects a resistance value of the exciting coil 7 and the control circuit 2*a* calculates a temperature of the exciting coil 7. FIG. 18 illustrates an example case where, while the relay 6 is in operation, the control circuit 2*a* measures the temperature of the exciting coil 7.

First, the control circuit 2*a* turns on the transistor TR2 (step S24). The control circuit 2*a* then turns off the transistor TR1 of the drive circuit 10 (step S25). Here, the fixed resistor R1 is necessary to have a resistance value with which the relay 6 can be kept turned on. Next, the control circuit 2*a* stands by for not less than 100 msec (step S26). Thereafter, the control circuit 2*a* measures a voltage VR at the point P positioned between the fixed resistor R1 and the exciting coil 7 (step S27).

Note that standby time of not less than 100 msec in each of the step S22 illustrated in FIG. 17 and the step S26 illustrated in FIG. 18 is a mere example. The standby time can be changed, provided that time can be secured which allows the voltage VR, at the point P positioned between the fixed resistor R1 and the exciting coil 7, to be in a steady state so that a resistance component of the exciting coil 7 is measured.

The transistors TR1 and TR2 illustrated in FIGS. 16 and 18 are each not limited to a transistor. Alternatively, each of the transistors TR1 and TR2 can be replaced with a switching element which is turned on or off in response to an input signal supplied from outside. Examples of the switching element encompass an FET, a photo-coupler, and a relay.

Figure 19:
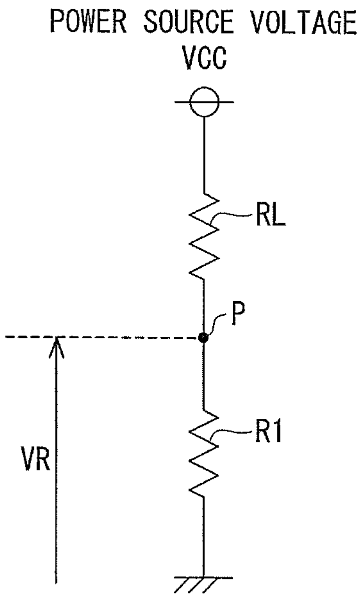
FIG. 19 is a view illustrating a calculation expression by which a temperature of the exciting coil 7 is calculated.

FIG. 19 is a view illustrating a calculation expression by which a temperature of the exciting coil 7 is calculated. A resistance value RL of the exciting coil 7 of the relay 6 is calculated from the following Expression 1.

$$RL=R1\times((VCC/VL)-1) \qquad \text{Expression 1}$$

where:

R1 denotes a fixed resistance value of the temperature detecting circuit (weld detecting circuit) 11;

VCC denotes a power source voltage;

VL denotes a voltage corresponding to a resistance value RL (VL=VCC−VR); and

VR denotes a voltage at the point P between the resistance value RL and the fixed resistor R1.

Figure 20:
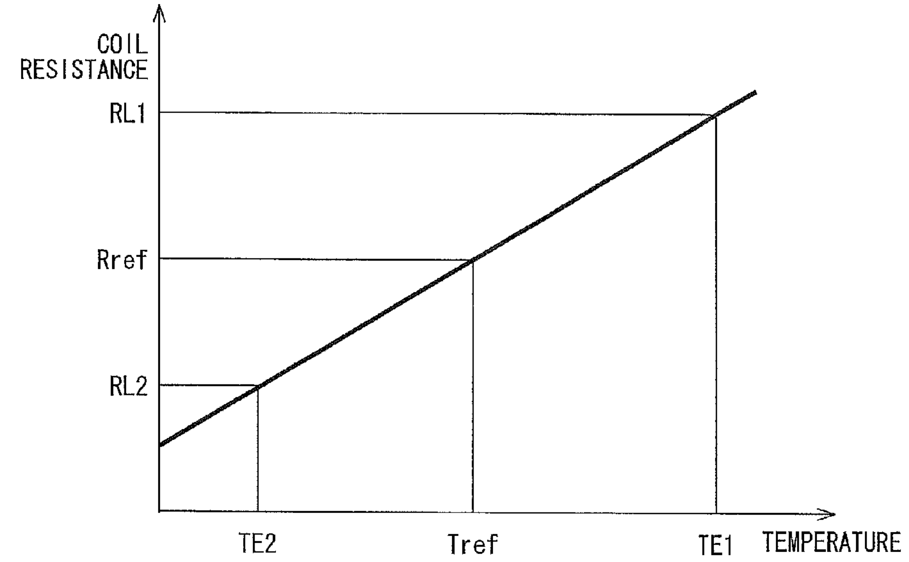
FIG. 20 is a graph illustrating a relationship between a resistance value and a temperature of a coil of a relay, which resistance value and temperature are detected by the relay control unit.

FIG. 20 is a graph illustrating a relationship between a resistance value RL and a temperature of the exciting coil of the relay 6, which resistance value RL and temperature are detected by the relay control unit 1*a*. A resistance value of the exciting coil 7, which is made up of a copper wire and which is provided to the relay 6, has a linear relationship with a temperature of the relay 6 (see FIG. 20). For example, in a case where the exciting coil 7 has a resistance value Rref of 25Ω (reference value), the relay 6 has a reference temperature Tref of 23° C. In a case where the exciting coil 7 has a resistance value RL1 of 31Ω (reference value×1.24), the relay 6 has a temperature TE1 of 85° C. In a case where the exciting coil 7 has a resistance value RL2 of 20.8Ω (reference value×0.83), the relay 6 has a temperature TE2 of −20° C. Thus, it is possible to calculate a temperature of the exciting coil 7 in accordance with a ratio between (i) the resistance value Rref of 25Ω in a case where the relay 6 has the temperature Tref of 23° C. and (ii) a resistance value of the exciting coil 7 which resistance value is detected by the temperature detecting circuit 11.

Figure 21:
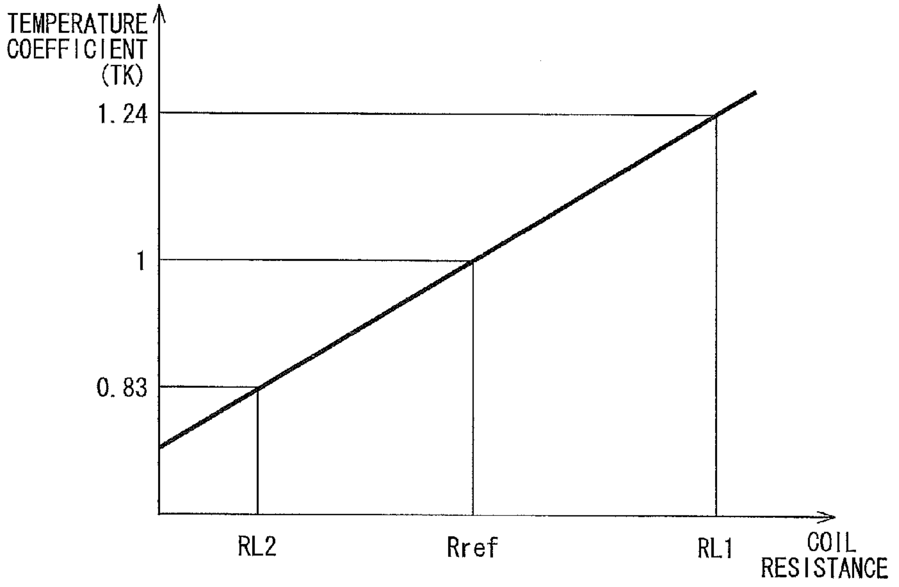
FIG. 21 is a graph illustrating how the relay control unit changes a PWM controlling value depending on a resistance value.

FIG. 21 is a graph illustrating how the relay control unit 1*a* changes a PWM controlling value depending on a resistance value of the exciting coil 7. The control circuit 2*a* changes the temperature coefficient TK, based on which the PWM controlling value, in accordance with which the PWM control is carried out with respect to the relay 6, is determined, depending on a resistance value of the exciting coil 7 which resistance value is detected by the temperature detecting circuit 11 (see FIG. 21), For example, in a case where the exciting coil 7 has the resistance value Rref of 25Ω (reference value) which resistance value Rref is detected by the temperature detecting circuit 11, the control circuit 2*a* sets the temperature coefficient TK, based on which the PWM controlling value is determined, to 1 (one). In a case where the exciting coil 7 has the resistance RL1 of 31Ω (reference value×1.24), the control circuit 2*a* sets the temperature coefficient TK, based on which the PWM controlling value is determined, to 1.24. In a case where the exciting coil 7 has the resistance value RL2 of 20.8Ω (reference value×0.83), the control circuit 2*a* sets the temperature coefficient TK, based on which the PWM controlling value is determined, to 0.83. The control circuit 2*a* thus changes the controlling value in accordance with which the PWM control is carried out with respect to the relay 6, depending on a resistance value of the exciting coil 7 which resistance value is detected by the temperature detecting circuit 11.

Calculation of Adjacency Coefficient

Again with reference to FIG. 13, the control circuit 2*a* changes a controlling value in accordance with which the PWM control is carried out with respect to one of the plurality of relays 6, depending on an on- or off-state(s) of other one(s) of the plurality of relays 6 which other one(s) is/are adjacent to the one of the plurality of relays 6.

Figure 22:
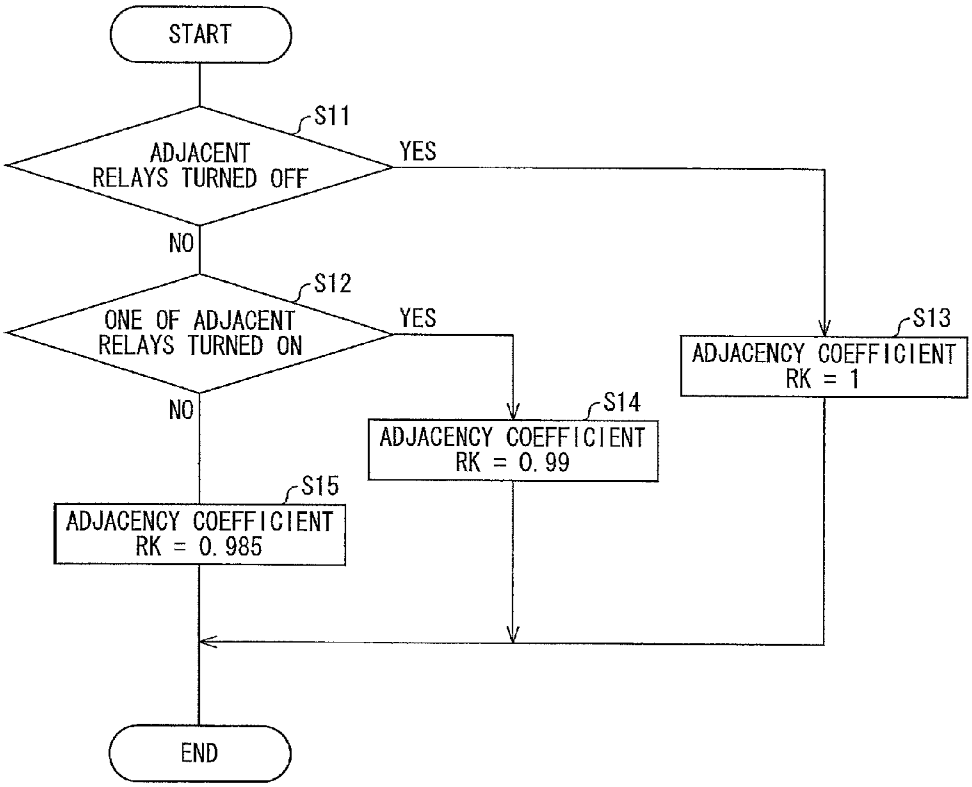
FIG. 22 is a flowchart illustrating how the relay control unit calculates an adjacency coefficient.
Figure 23:
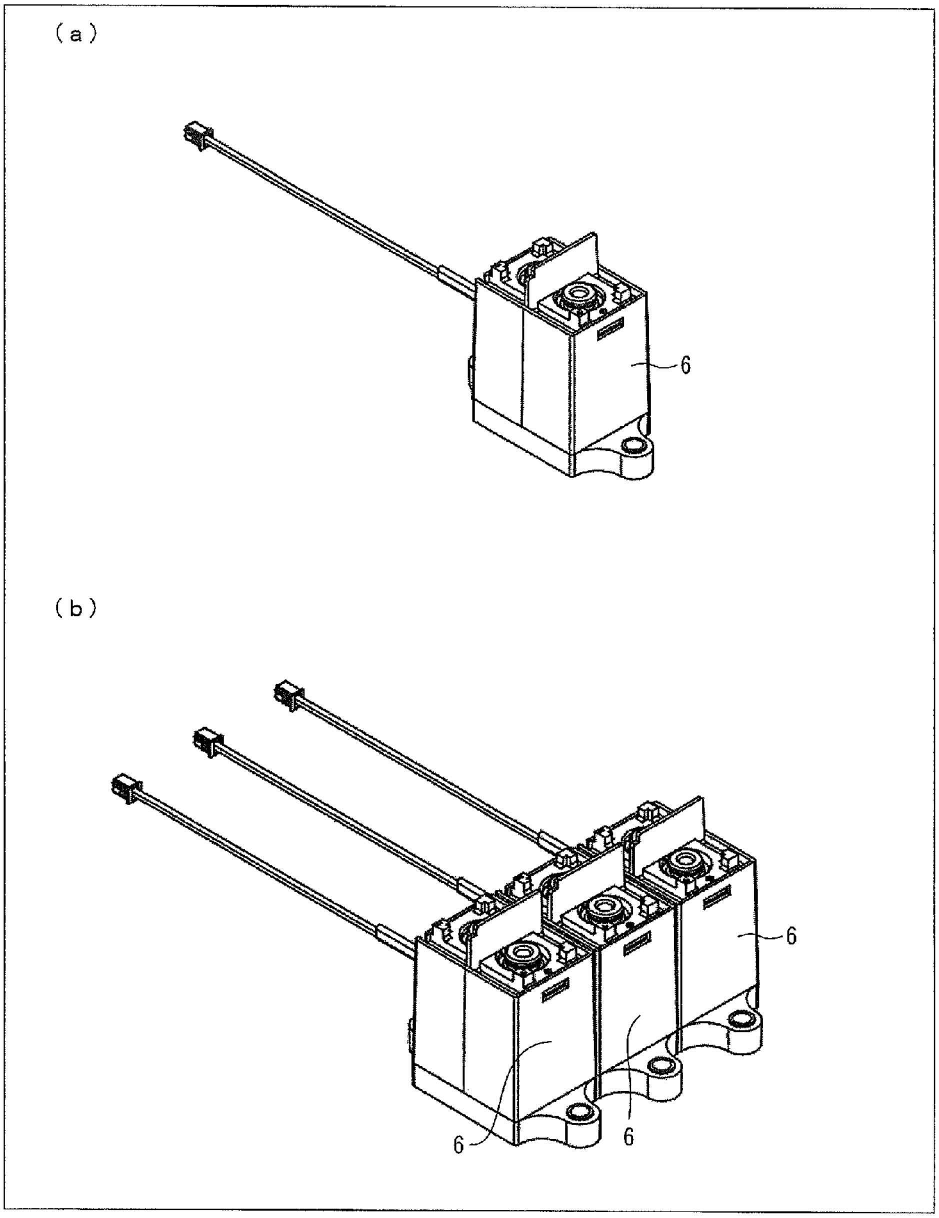
FIG. 23(*a*) is a perspective view illustrating an external appearance of a relay which the relay control unit controls.

FIG. 22 is a flowchart illustrating how the relay control unit 1*a* calculates an adjacency coefficient. FIG. 23(*a*) is a perspective view illustrating an external appearance of a relay 6 which the relay control unit 1*a* controls. FIG. 23(*b*) is a perspective view illustrating external appearances of relays 6 arranged so as to be adjacent to each other.

With reference to FIG. 23, the relays 6, included in the relay unit 16, are arranged so as to be adjacent to each other. A control characteristic of each of the relays 6 varies depending on an on- or off-state(s) of other one(s) of the relays 6 which other one(s) is/are adjacent to the each of the relays 6.

With reference to FIG. 22, the control circuit 2*a* first determines whether or not two of the plurality of relays 6, which two are adjacent to respective both sides of one of the plurality of relays 6, are tuned off (step S11). In a case where the control circuit 2*a* determines that the two of the plurality of relays 6 are turned off (Yes, in the step S11), the control circuit 2*a* sets, to 1 (one), an adjacency coefficient RK based on which the PWM controlling value is determined (step S13).

In a case where the control circuit 2*a* determines that at least one of the two of the plurality of relays 6 is turned on (No, in the step S11), the control circuit 2*a* determines whether or not only one of the two of the plurality of relays 6 is turned on (step S12). In a case where the control circuit 2*a* determines that only one of the two of the plurality of relays 6 is turned on (Yes, in the step S12), the control circuit 2*a* sets the adjacency coefficient RK, based on which the PWM controlling value is determined, to 0.99 (step S14).

In a case where control circuit 2*a* determines that only one of the two of the plurality of relays 6 is not turned on (No, in the step S12), the control circuit 2*a* determines that both of the two of the plurality of relays 6 are turned on, and sets the adjacency coefficient RK, based on which the PWM controlling value is determined, to 0.985 (step S15).

In a case where the control circuit 2*a* sets the adjacency coefficient RK, based on which the PWM controlling value is determined, to 1 (one) (in the step S13), to 0.99 (in the step S14), or to 0.985 (in the step S15), the control circuit 2*a* ends the process.

In this manner, in a case where a plurality of relays 6 are used, the control circuit 2*a* sets the adjacency coefficient (in the step S7) and then changes the controlling value in accordance with which the PWM control is carried out with respect to one of the plurality of relays 6 (in the step S8), depending on an on- or off-state(s) of other one(s) of the plurality of relays 6 which other one(s) is/are adjacent to the one of the plurality of relays 6.

FIG. 24 is view illustrating how the relay control unit 1*a* calculates a PWM value. The control circuit 2*a* controls the relay 6 in accordance with a PWM value obtained by multiplying a PWM reference value by a voltage coefficient VK, a vibration coefficient SK, a temperature coefficient TK, and an adjacency coefficient RK, which are changed by the above methods described with reference to FIGS. 14 through 22.

Note that Embodiment 2 has described an example case where the PWM reference value is multiplied by the voltage coefficient VK, the vibration coefficient SK, the temperature coefficient TK, and the adjacency coefficient RK. However, the present invention is not limited to such an arrangement. The PWM reference value can be alternatively multiplied by one of the voltage coefficient VK, the vibration coefficient SK, the temperature coefficient TK, and the adjacency coefficient RK. Alternatively, the PWM reference value can be multiplied by a combination of any of the voltage coefficient VK, the vibration coefficient SK, the temperature coefficient TK, and the adjacency coefficient RK.

The present invention is not limited to the description of the embodiments, but may be altered by a skilled person in the art within the scope of the claims. An embodiment derived from a proper combination of technical means disclosed in different embodiments is also encompassed in the technical scope of the present invention.

According to one or more embodiments of the present invention, a unit for controlling one or more electromagnetic relays each having a contact point and an exciting coil to which rated power is supplied so as to open and close the contact point, comprises: a control circuit which carries out PWM control so as to keep an electromagnetic relay turned on, after turning on the electromagnetic relay by causing rated power to be supplied to an exciting coil of the electromagnetic relay, the control circuit changing, depending on external information, a controlling value in accordance with which the PWM control is carried out with respect to the electromagnetic relay.

With this feature, it is possible to control the electromagnetic relay suitably depending on a change in environment around the electromagnetic relay, such as a temperature of the electromagnetic relay, vibration of the electromagnetic relay, operation of an electromagnetic relay(s) adjacent to the electromagnetic relay, and a voltage applied to the exciting coil of the electromagnetic relay.

The unit for controlling an electromagnetic relay in accordance with one or more embodiments of the present invention is arranged so as to further include: a temperature detecting circuit for detecting a resistance value of the exciting coil so as to allow the control circuit to calculate a temperature of the electromagnetic relay, the control circuit (i) detecting, from the temperature detecting circuit, a voltage corresponding to the resistance value of the exciting coil, (ii) calculating the temperature of the electromagnetic relay, and (iii) changing, depending on the temperature of the electromagnetic relay thus calculated, the controlling value in accordance with which the PWM control is carried out with respect to the electromagnetic relay.

With this feature, the temperature detecting circuit detects a resistance value of the exciting coil to which rated power is supplied so as to open and close a contact point of the electromagnetic relay, and the control circuit calculates a temperature of the electromagnetic relay. It is therefore possible to more suitably control, with a simple configuration, the electromagnetic relay depending on the temperature of the electromagnetic relay.

The unit for controlling an electromagnetic relay in accordance with one or more embodiments of the present invention is arranged such that the temperature detecting circuit includes: a switching element which is controlled by the control circuit; and a fixed resistor provided between the switching element and the exciting coil.

Note that the switching element may be a switch which is turned on or off in response to an input signal supplied from outside. Examples of the switching element encompass a transistor, an FET, a photo-coupler, and a relay.

According to the above configuration, it is possible to detect, with a simple configuration, a voltage corresponding to the exciting coil.

The unit for controlling an electromagnetic relay in accordance with one or more embodiments of the present invention is arranged such that, after turning on the switching element, the control circuit measures a voltage at an exciting coil side of the fixed resistor, and calculates the temperature of the electromagnetic relay in accordance with the voltage thus measured.

In one or more embodiments of the present invention, the temperature of the electromagnetic relay is detected before the electromagnetic relay is operated.

The unit for controlling an electromagnetic relay in accordance with one or more embodiments of the present invention is arranged such that, after turning on the switching element, the control circuit (i) measures a voltage at an exciting coil side of the fixed resistor, (ii) determines, in accordance with the voltage in a transient response state, whether or not a weld is present on a contact point of the electromagnetic relay, and (iii) calculates the temperature of the electromagnetic relay in accordance with the voltage in a steady state.

According to the above configuration, it is possible to detect the temperature of the electromagnetic relay in accordance with a resistance component of the exciting coil, and possible to detect presence of a weld on the contact point in accordance with an inductive component of the exciting coil.

The unit for controlling an electromagnetic relay in accordance with one or more embodiments of the present invention is arranged so as to further include: a drive circuit having a drive switching element for supplying the rated power to the exciting coil, after turning on the switching element, the control circuit turning off the drive switching element, and calculating the temperature of the electromagnetic relay in accordance with the voltage which has been measured.

According to the above configuration, it is possible to detect the temperature of the electromagnetic relay while the electromagnetic relay is in operation.

The unit for controlling an electromagnetic relay in accordance with one or more embodiments of the present invention is arranged such that the electromagnetic relay includes a plurality of electromagnetic relays connected in parallel to each other so as to be adjacent to each other; and the control circuit changes a controlling value in accordance with which the PWM control is carried out with respect to one of the plurality of electromagnetic relays, depending on an on- or off-state(s) of other one(s) of the plurality of electromagnetic relays which other one(s) is/are adjacent to the one of the plurality of electromagnetic relays.

According the above configuration, a controlling value, in accordance with which PWM control is carried out with respect to one of the plurality of electromagnetic relays, is changed depending on an on- or off-state(s) of other one(s) of the plurality of electromagnetic relays which other one(s) is/are adjacent to the one of the plurality of electromagnetic relays. A control characteristic of the electromagnetic relay is affected by an on- or off-state(s) of other electromagnetic relay(s) adjacent to the electromagnetic relay. It is therefore possible to more suitably control the electromagnetic relay depending on a change in environment around the electromagnetic relay, by changing, depending on the on- or off-state(s) of the other electromagnetic relay(s) adjacent to the electromagnetic relay, the controlling value in accordance with which the PWM control is carried out with respect to the electromagnetic relay.

The unit for controlling an electromagnetic relay in accordance with one or more embodiments of the present invention is arranged so as to further include a vibration sensor for detecting vibration applied to the electromagnetic relay, the control circuit changing, depending on a value of the vibration detected by the vibration sensor, the controlling value in accordance with which the PWM control is carried out with respect to the electromagnetic relay.

According to the above configuration, it is possible to more suitably control the electromagnetic relay depending on vibration applied to the electromagnetic relay.

The unit for controlling an electromagnetic relay in accordance with one or more embodiments of the present invention is arranged so as to further include a voltage monitoring circuit for monitoring a voltage applied to the exciting coil, the control circuit changing, depending on the voltage monitored by the voltage monitoring circuit, the controlling value in accordance with which the PWM control is carried out with respect to the electromagnetic relay.

According to the above configuration, it is possible to more suitably control the electromagnetic relay depending on a voltage applied to the exciting coil to which rated power is supplied so as to open and close the contact point.

According to one or more embodiments of the present invention, a method for controlling one or more electromagnetic relays each having a contact point and an exciting coil to which rated power is supplied so as to open and close the contact point, comprises: a PWM control step of carrying out PWM control so as to keep an electromagnetic relay turned on, after turning on the electromagnetic relay by causing rated power to be supplied to an exciting coil of the electromagnetic relay, wherein a controlling value in accordance with which the PWM control is carried out with respect to the electromagnetic relay being changed depending on external information.

The method of controlling an electromagnetic relay in accordance with one or more embodiments of the present invention further comprises: a resistance value detecting step of detecting a resistance value of the exciting coil so as that a temperature of the electromagnetic relay is calculated, wherein, in the PWM control step, the temperature of the electromagnetic relay being calculated in accordance with a voltage corresponding to the resistance value of the exciting coil detected in the detecting step, and the controlling value in accordance with which the PWM control is carried out with respect to the electromagnetic relay being changed depending on the temperature of the electromagnetic relay thus calculated.

In the method of controlling an electromagnetic relay in accordance with one or more embodiments of the present invention, the electromagnetic relay includes a plurality of electromagnetic relays connected in parallel to each other so as to be adjacent to each other; and in the PWM control step, a controlling value in accordance with which the PWM control is carried out with respect to one of the plurality of electromagnetic relays is changed depending on an on- or off-state(s) of other one(s) of the plurality of electromagnetic relays which other one(s) is/are adjacent to the one of the plurality of electromagnetic relays.

The method of controlling an electromagnetic relay in accordance with one or more embodiments of the present invention further comprises: a vibration detecting step of detecting vibration applied to the electromagnetic relay, in the PWM control step, the controlling value in accordance with which the PWM control is carried out with respect to the electromagnetic relay being changed depending on a value of the vibration detected in the vibration detecting step.

The method of controlling an electromagnetic relay in accordance with one or more embodiments of the present invention further comprises: a monitoring step of monitoring a voltage applied to the exciting coil, in the PWM control step, the controlling value in accordance with which the PWM control is carried out with respect to the electromagnetic relay being changed depending on the voltage monitored in the monitoring step.

One or more embodiments of the present invention may be applicable to a unit for controlling an electromagnetic relay which opens and closes a contact point by applying an electric current to an exciting coil.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 Relay control unit (unit for controlling electromagnetic relay)
2 Control circuit
4 Vibration sensor
5 Voltage monitoring circuit
6 Relay (electromagnetic relay)
7 Exciting coil
8 Movable contact point
9 Fixed contact point
10 Drive circuit
11 Temperature detecting circuit (weld detecting circuit)
12 Communication section
13 Display section
14 Memory
15 Host controller
16 Relay unit
TR1 Transistor (drive switching element)
TR2 Transistor (switching element)

The invention claimed is:

1. A unit for controlling one or more electromagnetic relays, each having a contact point and an exciting coil to which rated power is supplied so as to open and close the contact point, the unit comprising:

a control circuit which carries out PWM control so as to keep an electromagnetic relay turned on, after turning on the electromagnetic relay by causing rated power to be supplied to an exciting coil of the electromagnetic relay; and a temperature detecting circuit that detects a resistance value of the exciting coil so as to allow the control circuit to calculate a temperature of the electromagnetic relay, wherein the control circuit changes, depending on external information, a controlling value in accordance with which the PWM control is carried out with respect to the electromagnetic relay, wherein the control circuit detects, from the temperature detecting circuit, a voltage corresponding to the resistance value of the exciting coil, wherein the control circuit calculates the temperature of the electromagnetic relay, and wherein the control circuit changes, depending on the temperature of the electromagnetic relay thus calculated, the controlling value in accordance with which the PWM control is carried out with respect to the electromagnetic relay.

2. The unit as set forth in claim 1, wherein the temperature detecting circuit comprises:

a switching element which is controlled by the control circuit; and a fixed resistor provided between the switching element and the exciting coil.

3. The unit as set forth in claim 2, wherein, after turning on the switching element, the control circuit measures a voltage at an exciting coil side of the fixed resistor, and calculates the temperature of the electromagnetic relay in accordance with the voltage thus measured.

4. The unit as set forth in claim 3, further comprising:

a drive circuit having a drive switching element for supplying the rated power to the exciting coil, wherein, after turning on the switching element, the control circuit turns off the drive switching element, and calculates the temperature of the electromagnetic relay in accordance with the voltage which has been measured.

5. The unit as set forth in claim 2, wherein, after turning on the switching element, the control circuit measures a voltage at an exciting coil side of the fixed resistor, determines, in accordance with the voltage in a transient response state, whether or not a weld is present on a contact point of the electromagnetic relay, and calculates the temperature of the electromagnetic relay in accordance with the voltage in a steady state.

6. The unit as set forth in claim 1, wherein the electromagnetic relay includes a plurality of electromagnetic relays connected in parallel to each other so as to be adjacent to each other, and wherein the control circuit changes a controlling value in accordance with which the PWM control is carried out with respect to one of the plurality of electromagnetic relays, depending on an on- or off-state(s) of other one(s) of the plurality of electromagnetic relays which other one(s) is/are adjacent to the one of the plurality of electromagnetic relays.

7. The unit as set forth in claim 1, further comprising a vibration sensor for detecting vibration applied to the electromagnetic relay, wherein the control circuit changes, depending on a value of the vibration detected by the vibration sensor, the controlling value in accordance with which the PWM control is carried out with respect to the electromagnetic relay.

8. The unit as set forth in claim 1, further comprising:

a voltage monitoring circuit for monitoring a voltage applied to the exciting coil, wherein the control circuit changes, depending on the voltage monitored by the voltage monitoring circuit, the controlling value in accordance with which the PWM control is carried out with respect to the electromagnetic relay.

9. A method for controlling one or more electromagnetic relays each having a contact point and an exciting coil to which rated power is supplied so as to open and close the contact point, comprising:

a PWM control step of carrying out PWM control so as to keep an electromagnetic relay turned on, after turning on the electromagnetic relay by causing rated power to be supplied to an exciting coil of the electromagnetic relay; and a resistance value detecting step of detecting a resistance value of the exciting coil so as that a temperature of the electromagnetic relay is calculated, wherein, in the PWM control step, a controlling value in accordance with which the PWM control is carried out with respect to the electromagnetic relay being changed depending on external information, and wherein, in the PWM control step, the temperature of the electromagnetic relay is calculated in accordance with a voltage corresponding to the resistance value of the exciting coil detected in the resistance value detecting step, and the controlling value in accordance with which the PWM control is carried out with respect to the electromagnetic relay being changed depending on the temperature of the electromagnetic relay thus calculated.

10. The method as set forth in claim 9, wherein the electromagnetic relay includes a plurality of electromagnetic relays connected in parallel to each other so as to be adjacent to each other, and wherein, in the PWM control step, a controlling value in accordance with which the PWM control is carried out with respect to one of the plurality of electromagnetic relays is changed depending on an on- or off-state(s) of other one(s) of the plurality of electromagnetic relays which other one(s) is/are adjacent to the one of the plurality of electromagnetic relays.

11. The method as set forth in claim 9, further comprising:

a vibration detecting step of detecting vibration applied to the electromagnetic relay, wherein, in the PWM control step, the controlling value in accordance with which the PWM control is carried out with respect to the electromagnetic relay is changed depending on a value of the vibration detected in the vibration detecting step.

12. The method as set forth in claim 9, further comprising:

a monitoring step of monitoring a voltage applied to the exciting coil, wherein, in the PWM control step, the controlling value in accordance with which the PWM control is carried out with respect to the electromagnetic relay is changed depending on the voltage monitored in the monitoring step.

* * * * *